United States Patent
Ivry

[19]

[11] Patent Number: 5,942,003
[45] Date of Patent: Aug. 24, 1999

[54] ERROR BURST DETECTOR FOR LOWERING RECEIVER BIT ERROR RATE

[75] Inventor: Raanan Ivry, Haifa, Israel

[73] Assignee: LSI Logic Corporation, Milpitas, Calif.

[21] Appl. No.: 08/779,997

[22] Filed: Dec. 23, 1996

[51] Int. Cl.[6] .................................................. G06F 11/00
[52] U.S. Cl. .......................................... 714/762; 371/38.1
[58] Field of Search ................................ 371/39.1, 38.1, 371/37.7, 41, 45

[56] References Cited

U.S. PATENT DOCUMENTS

| | | | |
|---|---|---|---|
| 4,829,525 | 5/1989 | Sugiyama et al. | 371/38 |
| 4,845,713 | 7/1989 | Zook | 371/37 |
| 5,184,349 | 2/1993 | Riordan | 370/95.3 |
| 5,230,006 | 7/1993 | Kurokami | 375/14 |
| 5,420,873 | 5/1995 | Yamagishi et al. | 371/38.1 |
| 5,430,743 | 7/1995 | Marturano et al. | 371/43 |
| 5,475,677 | 12/1995 | Arnold et al. | 370/29 |
| 5,684,810 | 11/1997 | Nakamura et al. | 371/37.4 |
| 5,696,774 | 12/1997 | Inoue et al. | 371/37.4 |
| 5,708,665 | 1/1998 | Luthi et al. | 371/5.1 |

OTHER PUBLICATIONS

Sklar, Bernard, *Digital Communications: Fundamentals & Applications*, Prentice Hall, Englewood Cliffs, NJ, pp. 263–365, 1988.

*Primary Examiner*—Joseph E. Palys
*Attorney, Agent, or Firm*—Conley, Rose & Tayon, PC; B. Noel Kivlin

[57] ABSTRACT

A communications receiver system is presented for detecting burst errors and providing erasure information to the block decoder, thereby effectively doubling the conventional correction capability of the block decoder with only a minimal increase in complexity. In one embodiment, the receiver includes a demodulator modified to detect error bursts in the received symbol sequence. Once detected, the locations of symbols in error are marked in the form of erasure flags. An error correction decoder is then able to correct up to twice as many errors with the additional information provided by the erasure flags.

15 Claims, 4 Drawing Sheets

ERROR BURST DETECTOR FOR LOWERING RECEIVER BIT ERROR RATE

BACKGROUND OF THE INVENTION

1. Field of the Invention

This invention relates to the field of digital communication systems such as those that might be used for satellite transmission channels and cable channels, and in particular to error burst detectors which are used for improved decoding of error correction coded signals.

2. Description of the Relevant Art

The history of error correction coding begins with a discovery that any communications channel has a calculable capacity such that information transmission at a rate which does not exceed the capacity can be achieved with as small an error rate as desired. This information transmission is accomplished via the use of error correction coding. The discovery was based on ensemble averages, and consequently did not provide a useful code construction technique. An extensive amount of effort was expended in developing explicit code constructions which would provide asymptotically vanishing error rates, without success. The class of Hamming codes was then introduced, but these codes were only capable of correcting single errors. Other block codes were later developed, but they were accompanied by no general construction theory. In the late 1950's, a probabilistic approach to the decoding problem led to the development of tree codes, which have been primarily represented by convolutional codes. Then around 1960, Reed-Solomon codes and the more general Bose-Chadhuri-Hocquenghem codes provided a large class of multiple error correcting codes, which comprise one of the most important classes of block codes today. However, the performance of these codes suffers when extended to large block lengths. In the late 1960's and early 1970's the Viterbi decoder was introduced as a replacement for the sequential decoding of tree codes, thereby strengthening the feasibility of convolutional coding. Finally, in the 1970's the Justesen and Goppa code families were introduced which provided good codes with long block lengths, albeit with significantly more complex decoding algorithms.

Error control codes function by accepting input data symbols and processing them in such a way as to add some redundancy to the symbol sequence. All error control codes can be formulated so that this coding process takes the form of adding check symbols to the data symbol sequence. With this formulation, the encoder accepts an input word of k data symbols at each time step and produces a code word with n symbols, k of which are the input data symbols, and n–k of which are the check symbols. An example of such a code word 10 having k data symbols 12 and n–k check symbols 14 is shown in FIG. 1. The redundancy added by the check symbols serves to increase the distance between valid code symbol sequences. A common measure of the distance between two code words is the number of symbols in which they differ, defined herein as the Hamming distance. Shown in FIG. 2 are two code words 16 and 18 which are selected from the set of valid code words that make up an example block code. A comparison of two code words 16 and 18, shown in FIG. 2 reveals three symbol positions which differ: $D_3$, $D_5$, and $D_7$. Thus the Hamming distance between code words 16 and 18 is three. The minimum Hamming distance between any two sequences of code words is called the minimum Hamming distance of the code, and is often denoted $d^H_{min}$. For a block code, each code word in the sequence is unrelated to other code words, so this distance corresponds to the minimum Hamming distance between any two code words. In FIG. 2, the code words 16 and 18 are the nearest valid code words, so for this code $d^H_{min}=3$.

When code words are transmitted across a noisy channel, they are often subject to corruption. This corruption typically takes the form of symbol errors in the code word. Usually the locations of these errors are unknown prior to decoding, but in some cases it is possible to determine the locations of these errors prior to decoding. When this occurs, it is advantageous to mark their locations in some manner so that these symbols are disregarded in the decoding process. When this is done, these errors which are characterized by an unknown error value but a known error location can be referred to as erasures. The circumstances under which the code word will be correctly decoded are provided by the following equation:

$$n_E + 2n_c \leq d_{min}^H - 1,$$

where $n_E$ is the number of erasures and $n_e$ is the number of errors.

To illustrate the above equation, assume that code word 18 is transmitted and received as a corrupted code word 20 with two symbol errors. Consider the well known decoding algorithm wherein the received code word is compared to all valid code words, and the valid code word that is most like the received code word is chosen as the correct code word. Decoding is then accomplished by simply removing the check symbols from the chosen code word. In FIG. 2 code word 20 represents a received code word that contains two symbol errors. According to the equation, code word 20 may be incorrectly decoded, and indeed it differs by only one symbol from code word 16. According to the stated decoding algorithm, incorrect code word 16 is chosen, resulting in a decoding error. However, when the knowledge of the error locations is applied as shown by code word 22, then these symbols are ignored in the comparison process and code word 22 matches the correct code word 18. Consequently code word 22 with erasures is correctly decoded. In general, the number of erasures that a code can tolerate without making decision errors is twice the number of unerased errors that it can tolerate. Further details on the design and function of error correction codes may be found in Bernard Sklar, Digital Communications: Fundamentals and Applications, Prentice Hall, Englewood Cliffs N.J., pp. 263–365, 1988, incorporated herein by reference.

While this relation between error and erasure tolerance is well known, a practical mechanism for detecting error locations with high probability before decoding is not. The above equation shows that erasures and errors both impair the ability to decode correctly, and the only advantage gained by using erasures is the provision of additional side information to the decoder. When erasures are misapplied, that is, when the location of errors is misidentified, then decoding performance worsens.

The art of code design revolves around optimizing the tradeoff between code rate and Hamming distance gain for a given code complexity. Reed-Solomon codes are extremely popular because this family of codes is based on a construction that allows for custom tailoring of the information rate and Hamming distance properties of the code. Furthermore, efficient decoders are easy to design for these codes. However at large block lengths, the performance of Reed-Solomon codes suffers a loss of efficiency. A technique for extending the effective block length of these codes is to follow the Reed-Solomon encoder with an interleaver which acts to intersperse the symbols from one code word with the symbols from other code words. This is typically done by writing the code words into a memory matrix column-wise and reading the completed matrix row-wise. The interleaver can then be followed by a convolutional encoder which further adds redundancy to the symbol sequence. At the receiving end the process is reversed, first applying a convolutional decoder to the received sequence, next applying a de-interleaver, and finally performing the Reed-Solomon block decode. Each of the additional steps adds only a moderate amount of complexity to the system while significantly boosting its performance.

This arrangement is typically used in environments where code symbol errors caused by the channel can occur in bursts. Burst errors are not random isolated errors, but rather burst errors are defined as errors which occur in localized groups. Apart from the random uncorrelated noise, other effects may corrupt the transmitted signal. These effects are more bursty in nature (examples: microwave radiation close to the receiving antenna, lightning, home appliance electrical noise, etc.). The de-interleaver acts to distribute errors within a group so that they are isolated and fewer occur within a given code word. This in turn enhances the probability that the number of errors will not exceed the correction capability of the Reed-Solomon code. Nevertheless, it is still necessary to use Reed-Solomon codes of moderate length and complexity to keep the error correction capability high enough to preserve their resistance to burst errors.

Since error correction coding necessitates the transmission of check symbols in addition to the data symbols, the bandwidth available to the data symbols can be decreased to make room for the check symbols, or additional bandwidth can be allocated for the check symbols. The first option results in a reduction of the rate at which data can be transmitted, and the second option results in an increase in overall channel bandwidth. Typically one of these options is required, but the tradeoff is increased manufacturing tolerances, increased margin for equipment degradation, a reduction of the required signal-to-noise ratio, and an overall reduced probability of error.

Hence, error correction coding produces desirable performance gains in digital communication systems. This gain can be enhanced by a method for error burst detection.

SUMMARY OF THE INVENTION

The problems outlined above are in large part solved by a receiver with a mechanism for detecting burst errors and providing erasure information to the block decoder, thereby increasing the conventional correction capability of the block decoder with only a small increase in complexity. In one embodiment, the receiver includes a demodulator modified to detect error bursts in the received symbol sequence. Once detected, the locations of symbols in error are marked in the form of erasure flags. An error correction decoder is then able to correct up to twice as many errors with the additional information provided by the erasure flags.

Broadly speaking, the present invention contemplates a receiver for detecting and correcting errors within a received signal. The receiver comprises a demodulator coupled to a decoder. The demodulator includes a matched filter coupled to receive a modulated signal from an analog channel. The output of the matched filter is operatively coupled to an analog-to-digital converter. The combination of these elements provides a demodulated signal comprising a sequence of noise-corrupted symbols. The demodulator further includes a circuit for determining the energy of the noise which corrupts each symbol. The noise energy is passed through an error burst detection circuit which evaluates the likelihood that the channel is in the following states: a good state and an error burst state. A state determination circuit is then used to assert erasure flags when the channel is in an error burst state, and de-assert erasure flags when the channel is in a good state. The asserted erasure flags are aligned with the symbols received while the channel is in the error burst state. The erasure flags thereby serve to identify the locations of symbol errors in the demodulated signal. The erasure flags are passed to the decoder in conjunction with the demodulated signal. The decoder then detects and corrects errors in the demodulated signal and provides a decoded symbol sequence.

The present invention also contemplates a communications system comprising an encoder, a modulator, an analog channel and a receiver which are all serially coupled in the order listed. The encoder accepts a digital signal and converts it to an encoded signal. The encoded signal is modulated by the modulator and transmitted via the analog channel to the receiver. The receiver has a channel state determination circuit which provides erasure flags aligned with burst error locations in a code word. The erasure flagged code words are then decoded though use of a decoder. The receiver thereby receives the transmitted signal and converts the transmitted signal to substantially the original digital signal.

BRIEF DESCRIPTION OF THE DRAWINGS

Other objects and advantages of the invention will become apparent upon reading the following detailed description and upon reference to the accompanying drawings in which.

Figure 1:
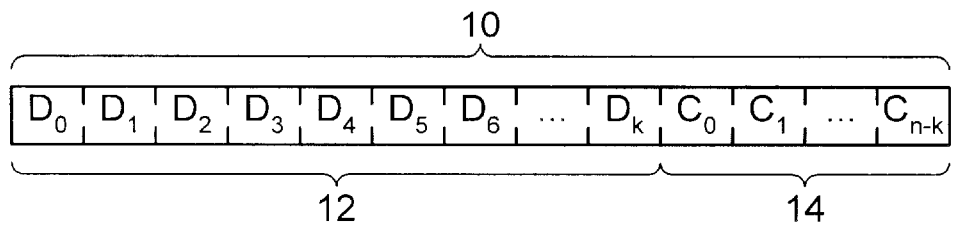
FIG. 1 is a code word comprising a structured sequence of data symbols and check symbols encoded according to a block and/or convolutional encoder.
Figure 2:
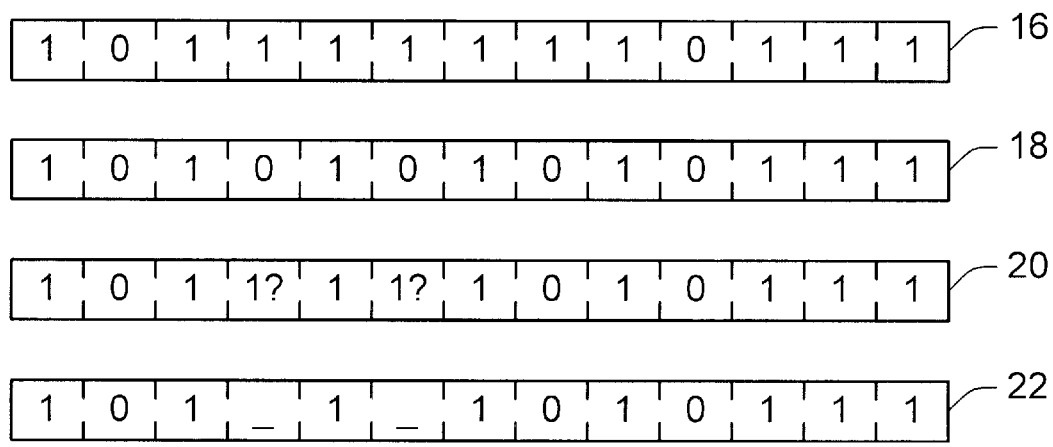
FIG. 2 is set of code words exemplifying a correct code word, an incorrect yet valid code word, a corrupted version of the correct code word with errors, and a corrupted version of the correct code word with erasures.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
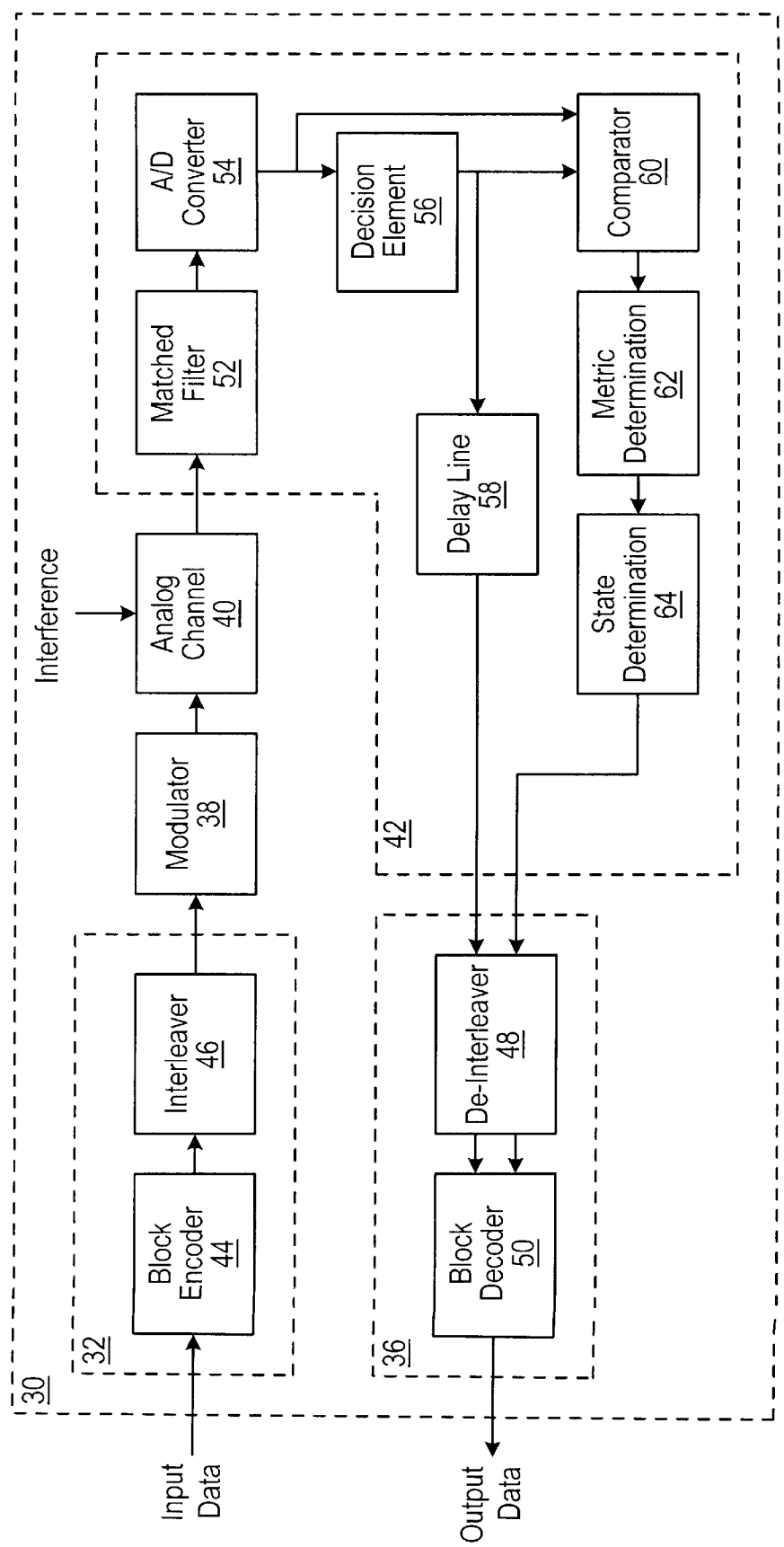
FIG. 3 is a block diagram of a digital communications system having an improved demodulator capable of providing symbol erasure information to an error correction decoder.

Turning now to the drawings, FIG. 3 represents a digital communications system 30 which employs an improved demodulator. Digital communications system 30 comprises an encoder 32, a modulator 38, an analog channel 40, a demodulator 42, and a decoder 36, all of which are coupled serially in the order listed.

Digital communications system 30 serves to accept, transport and reliably reconstruct input data. Digital communications system 30 uses an encoder-decoder pair to implement an error correction code such as a Reed-Solomon block code. Usage of error correction coding decreases the probability of a symbol error and thereby increases the reliability of the system. Encoder 32 encodes the input data stream. Modulator 38 converts the encoded data stream into a modulated signal which can be transported via analog channel 30. Analog channel 40 is subject to interference which corrupts the modulated signal. The interference typically appears as an additive noise signal which has two modes: a random mode and a burst mode. The random interference normally produces only random isolated symbol errors, and can be characterized using a Gaussian probability distribution. The burst interference, which is usually "strong" noise, produces a localized group of errors, and can be characterized using a uniform probability distribution.

The signal received at the output of analog channel 40 is the sum of the noise signal and the modulated signal. Demodulator 42 accepts the noise-corrupted receive signal and converts it to a detected data stream. The detected data stream is ideally the same as the encoded data stream, but due to the noise corruption, may contain symbol errors. In many channel environments, the interference is subject to "bursty" behavior, i.e. short, intense increases in the level of interference. This behavior results in groups of symbol errors in the detected data stream. Demodulator 42 detects the increases in interference level and provides a sequence of erasure flags to identify the groups of errors in the detected data stream. Decoder 36 converts the detected data stream into an output data stream, using the sequence of erasure flags to increase the number of symbol errors which may be corrected.

Encoder 32 performs two functions: error correction encoding and interleaving. To achieve this, a preferred encoder hereof comprises a block encoder 44 and an interleaver 46. Block encoder 44 encodes the input data preferably using a Reed-Solomon encoding scheme. Interleaver 46 acts to take adjacent code symbols and disperse them in the encoded data stream. A de-interleaving operation is performed after transmission, with the result that the dispersed symbols will be recollected to their initial positions (prior to interleaving) before entering the decoder. This prevents a typical interference burst from causing enough symbol errors in one code word to exceed the correction limit of the code being used.

Modulator 38 converts the encoded data stream into a modulated signal which analog channel 40 can transport. Any known digital modulation technique may be used, including antipodal signaling, orthogonal signaling, multi-amplitude signaling, multi-phase signaling, and quadrature signaling. The modulation method is chosen as one which has less susceptibility to interference on analog channel 40.

Analog channel 40 may comprise either a transmission or storage medium by which the modulated signal can be transported across space and/or time. Transmission media which accomplish the former include microwave links, wave guides, transmission lines, and optic fibers. Storage media which accomplish the latter include magnetic media, compact disks, and random-access memory. Regardless of the channel function, the modulated signal experiences some interference in the form of an additive noise signal. The interference may cause symbol errors at certain symbol locations present at the output of demodulator 42. This is the motivation for using error correction coding hereof.

Demodulator 42 recovers a noise-corrupted version of the modulated signal and converts it to a detected data stream with associated erasure flags. The detected data stream is ideally equal to the encoded data stream, but due to the noise corruption, symbol errors may exist. Demodulator 42 will identify symbol errors by asserting an erasure flag for locations in which symbol errors are present. Demodulator 42 comprises a matched filter 52, an analog-to-digital (A/D) converter 54, a decision element 56, and a delay line 58, which are all coupled serially within a communication path in the order listed. Demodulator 42 further comprises a comparator 60, a metric determination unit 62, and a state determination unit 64 coupled outside the communication path.

Matched filter 52 filters the noise-corrupted modulated signal in preparation for A/D conversion. The purpose of a matched filter is to maximize the signal-to-noise ratio of an information-carrying signal. As explained in many standard texts (see, e.g., Haykin, "Communication Systems, second edition", 1983 John Wiley & Sons, New York, pp. 530–540, incorporated herein by reference) this is accomplished by designing the filter response to be a time-reversed replica of the un-modulated signal. The output signal of matched filter 52 is sampled by A/D converter 54, which then provides a digital filtered signal. Alternate methods for producing the digital filtered signal from the noise-corrupted modulation signal are discussed later, and it is intended that these methods be included in the scope of the present invention.

Demodulator 42 embodies matched filter 52 and A/D converter 54 in the communication path. Two additional elements are placed in the communication path: decision element 56 and delay line 58. Decision element 56 accepts a sequence of digital filtered signal samples and operates on each of them to determine the closest code symbol. The sequence of code symbols provided by decision element 56 forms a detected symbol stream which passes through delay line 58. Delay line 58 acts to buffer the code symbols until an erasure flag for each code symbol is determined. Once each symbol obtains an associated erasure flag, the symbol is passed with its erasure flag to decoder 36.

The erasure flags are generated outside the communication path in the following manner. Comparator 60 is coupled to compare the input and output of decision element 56. Comparator 60 compares the detected symbols at the output of decision element 56 to the digital filtered signal samples at the input of decision element 56. The difference between the input and output of decision element 56 is a sequence of error values due to interference on analog channel 40. The sequence of error values is hereby defined to be an error signal. Comparator 60 squares the error signal to provide an error energy signal. Alternatively, the error energy signal may be formed by taking the absolute value of the error signal.

The output line from comparator 60 couples the error energy signal to metric determination unit 62, which in turn is coupled to state determination unit 64. The output of state determination unit is coupled to conditionally set erasure flags of symbols contained by delay line 58. This point is discussed in detail later.

Figure 4:
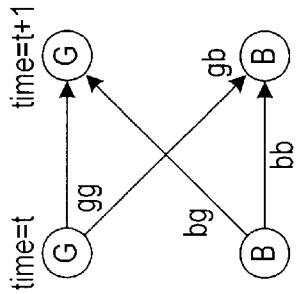
FIG. 4 is a diagram of an exemplary signal constellation illustrating the role played by interference.

Turning now to FIG. 4, a 16-QAM (16 point quadrature amplitude modulation) constellation is shown as an exemplary modulation scheme. The 16 points represent valid symbols which form the output of decision element 56. A digital filtered signal sample 70 is subject to interference which causes it to appear at some distance from a closest valid symbol 72. When decision element 56 receives digital filtered signal sample 70 as input, it provides closest valid symbol 72 as output. Two error value components X and Y are determined by comparator 60 as the decision element input and output are compared. Comparator 60 provides the value $X^2+Y^2$ to metric determination unit 62.

It is noted that other digital modulation schemes may be used. The point of interest is that some measurement of the energy of the error between the received signal and an ideal signal can be made.

Figure 5A:
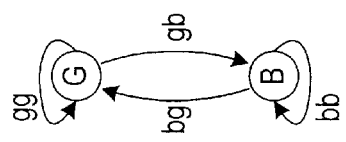
FIGS. 5a–5c shows an illustration of the operation of a metric determination unit.
Figure 5B:
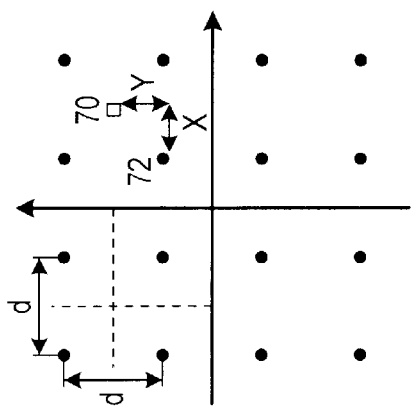

Turning now to FIG. 5, the operation of metric determination unit 62 is illustrated. FIG. 5a shows a state transition diagram for a model of the errors in a bursty analog channel 40. The channel can be in two states: State B represents a channel state during an interference burst. When the channel is in this state, the disturbance is very high, so that it may be assumed that the disturbance is uniformly distributed in a rectangle of length d and width d (see FIG. 4). State G represents a channel state absent an interference burst. When the channel is in this state, the only disturbance is white gaussian noise. At each time step, one of four transitions (denoted as gg, gb, bb, and bg) is taken. The transition probabilities are $P_{gg}$, $P_{gb}$, $P_{bb}$, and $P_{bg}$ respectively. The function of metric determination unit 62 is to determine for each state which of the incoming transitions was most likely for the previous time step. This is accomplished in part by calculating the likelihood that the channel is in each state at each time step. Assuming the channel model described in FIG. 5a, the method used is shown in FIG. 5b. A derivation of the method follows, starting from the equation for the conditional state path probability:

$$P(\overline{S}_t | \overline{X}_t, \overline{Y}_t) = \frac{P(\overline{X}_t, \overline{Y}_t | \overline{S}_t) P(\overline{S}_t)}{P(\overline{X}_t, \overline{Y}_t)},$$

where $\overline{S}_t$ is a sequence of states (also referred to as a path) ending in the current state at time t, and $\overline{X}_t$ and $\overline{Y}_t$ are sequences of noise samples X and Y. Since the object is to find the sequence of channel states with the maximum probability, and the denominator is independent of the state sequence $\overline{S}_t$, the denominator may be neglected. Furthermore, taking a logarithm does not alter the determination of the maximum, since the logarithm of the larger of two numbers is the larger of the two logarithms. Therefore, the maximum probability state sequence may be found using the following expression, referred to hereafter as the likelihood:

$$\ln\{P(\overline{X}_t,\overline{Y}_t|\overline{S}_t)\}+\ln\{P(\overline{S}_t)\}=\ln\{P(X_t,Y_t|S_t) \ldots P(X_2,Y_2|S_2)P(X_1,Y_1|S_1)\}+\ln\{P(S_t,\ldots,S_2,S_1)\}=\ln\{P(X_t,Y_t|S_t)\}+\ln\{P(S_t|S_{t-1})\}+\ln\{P(\overline{X}_{t-1},\overline{Y}_{t-1}|\overline{S}_{t-1})\}+\ln\{P(\overline{S}_{t-1})\}$$

Careful examination of the last equation reveals that the likelihood can be calculated iteratively by adding the term in square brackets to the likelihood from the previous time step. Referring to FIG. 5b, the most likely sequence ending in state G at time t is found by first calculating the likelihood of the most likely sequence ending in state G at time t−1 being extended to state G at time t, second, calculating the likelihood of the most likely sequence ending in state B at time t−1 being extended to state G at time t, and third, choosing the most likely of the two resulting sequences ending in state G at time t. This series of steps is similarly applied to the sequences ending in state B at time t.

In the table below, the following assumptions are made. The probability density function of X and Y when the channel is in state G is assumed to be Gaussian. The probability density function of X and Y when the channel is in state B is assumed to be uniform. The terms in the likelihood expression for each of the four transitions are:

| Transition | $\ln\{P(S_t\|S_{t-1})\}$ | $\ln\{P(X_t,Y_t\|S_t)\}$ | $\ln\{P(\overline{X}_{t-1},\overline{Y}_{t-1}\|\overline{S}_{t-1})\} + \ln\{P(\overline{S}_{t-1})\}$ |
|---|---|---|---|
| bb | $\ln(P_{bb})$ | $-2\ln(d)$ | $L_B(t-1)$ |
| gb | $\ln(P_{gb})$ | $-2\ln(d)$ | $L_G(t-1)$ |
| gg | $\ln(1-P_{gb})$ | $-\frac{X_t^2+Y_t^2}{2\sigma^2} - \ln\{2\pi\sigma^2\}$ | $L_B(t-1)$ |
| bg | $\ln(1-P_{bb})$ | $-\frac{X_t^2+Y_t^2}{2\sigma^2} - \ln\{2\pi\sigma^2\}$ | $L_G(t-1)$ |

The error distribution range of the uniform probability distribution is denoted d (see FIG. 4). The variance of the Gaussian error distribution is denoted by $\sigma^2$. $L_B(t-1)$ and $L_G(t-1)$ are the recursively calculated likelihoods:

$$L_B(t) = \max[\ln\{P_{bb}\} - 2\ln\{d\} + L_B(t-1), \ln\{P_{gb}\} - 2\ln\{d\} + L_G(t-1)]$$

$$L_G(t) = \max\left[\ln\{1-P_{bb}\} - \frac{X_t^2+Y_t^2}{2\sigma^2} - \ln\{2\pi\sigma^2\} + L_B(t-1),\right.$$
$$\left.\ln\{1-P_{gb}\} - \frac{X_t^2+Y_t^2}{2\sigma^2} - \ln\{2\pi\sigma^2\} + L_G(t-1)\right]$$

Figure 5C:
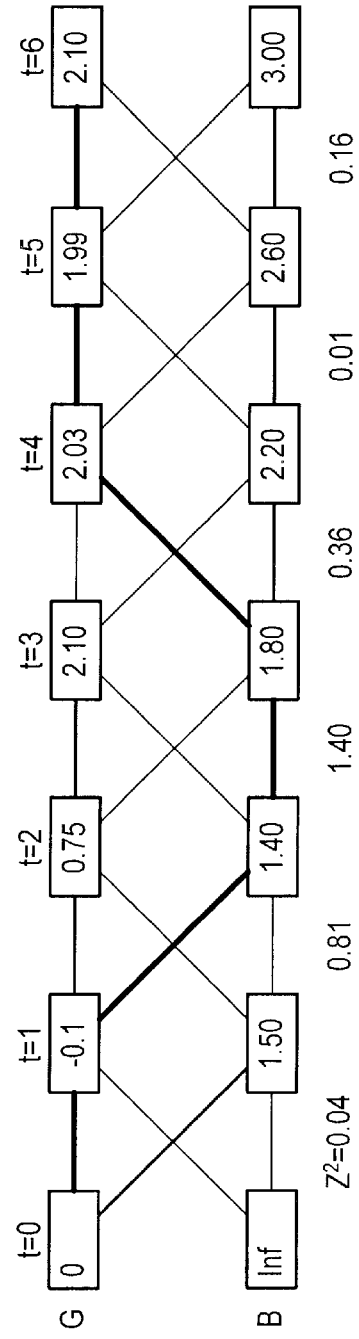

These equations may be simplified by scaling. Letting $M=-2\sigma^2 L$, the following metric equations are achieved:

$$M_B(t)=\min[K_1+M_B(t-1), K_2+M_G(t-1)]$$

$$M_G(t)=\min[K_3+X_t^2+Y_t^2+M_B(t-1), K_4+X_t^2+Y_t^2+M_G(t-1)],$$

where $K_1$, $K_2$, $K_3$ and $K_4$ are appropriately chosen constants. The use of the metric equations is shown by example in FIG. 5c. For demonstration purposes, assume that $K_1=0.40$, $K_2=1.50$, $K_3=-0.13$, and $K_4=0.05$. Further assume that the energy $Z^2=X^2+Y^2$ of the sequence of noise samples is as shown below the trellis in FIG. 5c. The metric equations are used to determine the extension with the minimum metric, which corresponds to the maximum likelihood. The minimum metric then is then stored, and the selected extension in marked. In FIG. 5c, this is depicted by writing the minimum metric value in the box, and drawing a thick line for the selected extension. At a given time the most likely sequence of states may be found by starting at the state with the smallest minimum metric and tracing backwards. At t=6, for instance, the most likely sequence of states is GGB-BGGG (as indicated by the thickest lines).

Figure 6:
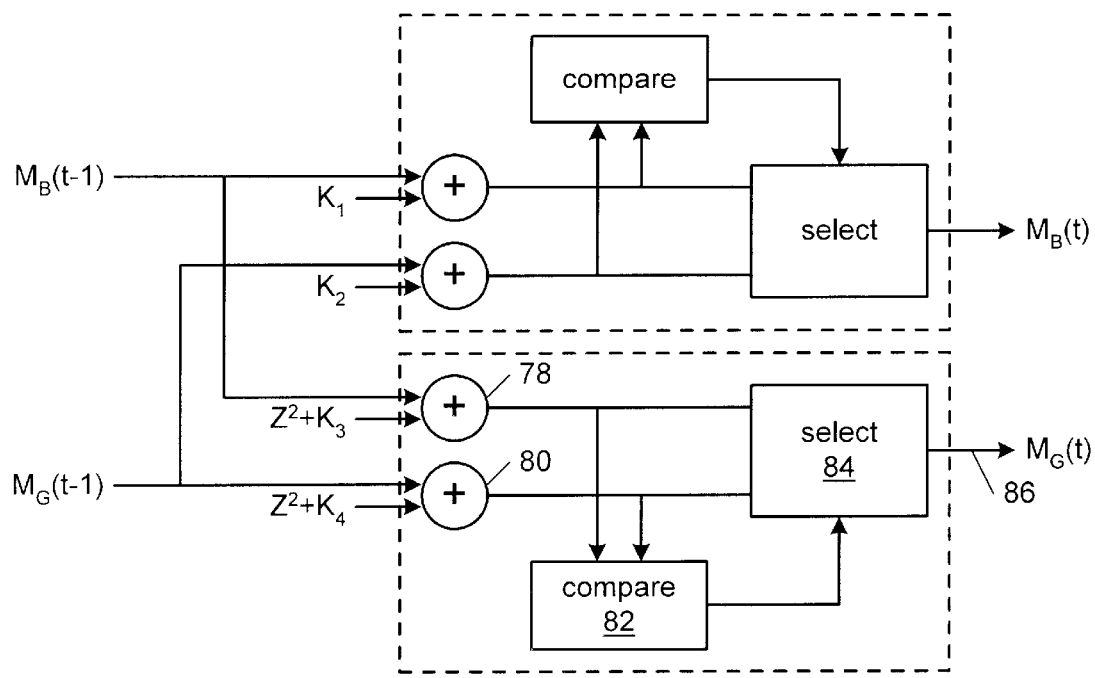
FIG. 6 is a block diagram of the metric determination unit.

Turning now to FIG. 6, a block diagram of a metric determination unit is shown. Adders 78 and 80 each sum an update term with a metric from time t−1. The resulting metrics are compared by comparator 82, and the minimum is multiplexed to output line 86 by select unit 84. A separate add-compare-select circuit performs the other half of the computation in parallel. The output from the comparators can be used to indicate the selected extension. Accordingly, the comparator output is forwarded to state determination unit 64 which stores the comparator output in a form suitable to determine the most likely state sequences. Determination unit 64 may be implemented in the same manner as a second stage of a Viterbi decoder. Two popular methods exist for this: the register exchange method, and the traceback method.

In the register exchange method, each channel state has two registers associated with it. One register of the two contains the state sequence ending in the state at time t−1. The second register of the two contains the state sequence ending in the state at time t. The signals indicating the chosen extensions to state sequences are then used to load the second register per state with the contents of the appropriate first register. The extension to the state sequence for each state is also loaded into the second register, thereby updating the state sequence ending in each state. The contents of a given first register may form the input for more than one of the second registers. Similarly, the contents of a given first register might not be used as input for any of the second registers, and thereby be discarded. At each time step, the registers "exchange" places with the first becoming the second and vice versa.

The registers are all initialized to zero, and the transitions (extensions) which are added to the sequence of states take the form of a state bit indicating the state from which the transition originated from.

Once the registers fill, the beginning of each of the state sequences will typically have originated from the contents of a common register many steps previously. In this case, the first state bit is shared by all of the state sequences, including the most likely state sequence. This first state bit is then rendered as a symbol erasure flag at each time step after the registers have filled. Note that this approach typically requires a flush of the registers to finish the flagging of the received sequence.

The second implementation method is the traceback method. For this method, a random access memory (RAM) is often used. The RAM is organized into rows and columns. The columns represent time steps, i.e., t=0, t=1, etc. in the decoder trellis, and the rows represent the states, i.e., G,B, at each time step. Each location in the RAM is assumed to hold a pointer to a state in the previous column, the state from which the extension of the most likely state sequence to the current state originates. Note that this pointer may take the form a state bit which indicates the state from which the chosen transition originates.

The traceback method operates in the following manner: At each time step, the chosen transitions are stored in a column. One state is chosen as a starting point, and a traceback begins. The traceback consists of repeated reads from the RAM, each read accessing a column which precedes the column last accessed. The row used in each read is specified by the contents of the location last read. In this manner, it is possible to "trace backward" through the RAM and, more specifically, through the decoder trellis as described in FIG. 5c. After tracing backward a fixed number of steps, the last transition is rendered as a symbol erasure flag in similar fashion to the previous method.

State determination unit 64 is coupled to conditionally set erasure flags of symbols contained by delay line 58. State determination unit 64 asserts the erasure flags associated with error symbols as indicated by the channel being in an error burst state (state B). The detected symbol sequence with associated erasure flags is then forwarded to decoder 36. The erasure flags are then attributed in proper time sequence to the symbols within the code word via delay line 58. Delay line 58 essentially operates as a buffer for storing code words as they arrive across the communication channel. The amount of delay within the buffer is adjusted so that each symbol of a code word is delayed sufficiently to allow a flag associated with that symbol to be placed with its corresponding symbol. Since comparing, metric determination and state determination functions require a defined amount of time, the delay amount of delay line 58 equal the throughput delay associated with those elements.

Decoder 36 has two functions: de-interleaving and decoding. Decoder 36 is comprised of de-interleaver 48 and block decoder 50. De-interleaver 48 is coupled to receive the detected symbol sequence with associated erasure flags and produce a de-interleaved symbol sequence with associated erasure flags by reversing the actions of interleaver 46. The de-interleaved symbol sequence is ideally equal to the encoded data stream, but the interference on analog channel may result in the presence of errors in the de-interleaved symbol sequence. If a burst error is present in the detected symbol sequence, the effect of the de-interleaving will be to disperse the symbol errors in the de-interleaved symbol sequence so that the symbol errors are no longer adjacent each other. This dispersion aspect provides improved block decoder performance since each code word is made to contain fewer symbol errors.

Block decoder 50 serves to convert the de-interleaved symbol sequence with associated erasure flags to an output data stream which is ideally equal to the input data stream. Block decoder 50 is preferentially a Reed-Solomon decoder chosen to invert the operation of block encoder 44. Block decoder 50 is designed to correct symbol errors using the additional information provided by the erasure flags to double the maximum number of errors which can be corrected in a code word. If all the symbol error locations are known, twice as many errors can be corrected than if none of the symbol error locations are known. Since the erasure flags serve to indicate the location of symbol errors, block decoder 50 is designed to make use of this information, and thereby attain the increased error correcting capability. Digital communications system 30 consequently attains a substantially increased reliability with only a small increase in complexity.

A correspondence in reliability and complexity exists. The correspondence may be manipulated in the following manner. If the improved reliability is much greater than what is required, simpler block encoder-decoder pair with reduced error correction capability may be used. This effectively reduces the overall system complexity while maintaining or slightly improving the overall system reliability through use of the improved demodulator.

Decision element 56 may take the form of one or more comparators, each of which simply determines whether a digital filtered signal sample is greater than or less than a given value. The given values are chosen to be the midpoints between valid symbol values. In this manner, the decision element is able to find the valid symbol value closest to the digital filtered signal sample, in effect rounding or truncating the signal sample. The closest valid symbol value is chosen as the correct symbol. This is often referred to as making a hard decision. One example of the function of the decision element follows: Let valid symbol values be 0,1,2, and 3. Assume the received digital filtered signal samples are 1.1, 5.7, and 1.6. The decisions rendered by the decision element are 1, 3, and 2, respectively.

Decision element 56 may also be cast in the form of a linear equalizer, maximum likelihood sequence estimator, and decision feedback equalizer. Other standard symbol detection methods may also be used.

Figure 7A:
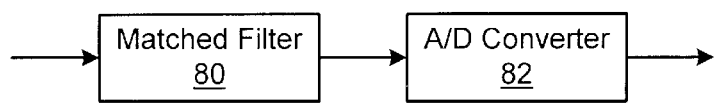
FIGS. 7a and 7b are a block diagrams showing two equivalent methods by which demodulation may be achieved.
Figure 7B:
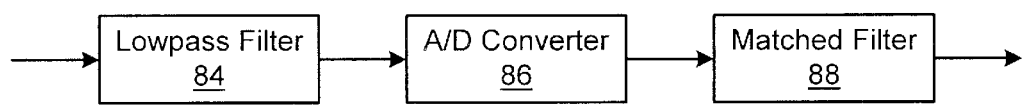

FIG. 7 is used to illustrate the fact that the digital filtered signal may be generated by alternate means without adversely affecting the performance of demodulator 42. It should be recognized that filtering which is performed in the continuous time domain can also be performed in the digital domain when certain criteria are met. FIG. 7a shows a matched filter 90 followed by A/D converter 92. This is the above disclosed method for generating the digital filtered signal from the noise-corrupted modulated signal. In some applications where the sampling frequency of the A/D converter is more than twice the highest frequency component of the modulated signal, the matched filter may be replaced by a low-pass filter, and the matched filtering operation performed digitally after the noise-corrupted modulated signal has been converted to a digital signal. This observation follows from a well-known theorem that no information is lost in the conversion from the continuous-time domain to the digital domain if the sampling frequency exceeds twice the highest frequency component of the continuous-time signal. If proper sampling occurs, moving the matched filtering operation to the digital domain operates the same as if matched filtering occurs prior to A/D conversion. FIG. 7b shows a configuration which accomplishes this, and which may be regarded as equivalent to FIG. 7a. In FIG. 7b, a low-pass filter 94 is followed by an A/D converter 96, which is then followed by a digital matched filter 98. In some applications the desired sampling frequency is not twice the highest frequency component of the continuous time signal. In these applications the configuration of FIG. 7b may still be used if the sampling frequency of the A/D converter is first increased as required. Then, after the matched filter, a decimation operation is performed to reduce the sampling frequency back to the desired level.

It is noted that various other encoder-decoder pairs may be used with this system. Convolutional codes, block codes, interleavers, and various combinations may be employed for error correction.

Numerous variations and modifications will become apparent to those skilled in the art once the above disclosure is fully appreciated. It is intended that the following claims be interpreted to embrace all such variations and modifications.

What is claimed is:

1. A communications system comprising:
   a modulator coupled to receive a digital signal and thereafter convert said digital signal to a modulated signal;
   an analog channel adapted to receive said modulated signal and impute random interference and burst interference thereon; and
   a demodulator configured to provide a sequence of demodulated symbols and an erasure flag associated with said sequence of demodulated symbols at a time period in which said analog channel imputes the burst interference;
      an analog-to-digital converter operably coupled to convert said modulated signal to a sequence of samples;
      a decision element coupled to convert said sequence of samples to said sequence of demodulated symbols;
      a comparator coupled to determine a difference between said sequence of samples and said sequence of demodulated symbols, said comparator configured to provide an error energy signal representative of said difference;
      a metric determination unit coupled to convert said error energy signal to a sequence of transitions to one of a pair of states, wherein a first of said pair of states is indicative of random interference, and wherein a second of said pair of states is indicative of burst interference; and
      a delay line for storing said sequence of demodulated symbols and attributing an erasure flag to one of said sequence of demodulated symbols corresponding to second state.

2. The communications system as recited in claim 1, wherein said demodulator further comprises a state determination unit coupled to convert said sequence of transitions to a sequence of states.

3. The communications system as recited in claim 1, wherein said erasure flag is set during said time in which said analog channel imputes burst interference.

4. The communication system as recited in claim 1, further comprising a decoder coupled (i) to receive said sequence of demodulated symbols and said erasure flag, (ii) to correct erasures and errors in said sequence of demodulated symbols with said erasure flag, and (iii) to convert said sequence of demodulated symbols to substantially said digital signal.

5. The communications system as recited in claim 1, further comprising:
   a Reed-Solomon encoder configured to convert a stream of digital input data to a coded digital signal; and
   an interleaver coupled to receive said coded digital signal and thereafter re-order the sequence of said coded digital signal for presentment as said digital signal to the modulator.

6. A receiver apparatus for detecting and correcting errors within a received signal, comprising:
   a demodulator configured to provide a demodulated digital signal with associated erasure flags indicative of regions in which said received signal is subject to burst interference, said demodulator comprising:
      a matched filter configured to convert said received signal to a filtered signal;
      an analog-to-digital converter configured to convert said filtered signal to a sequence of samples;
      a decision element configured to convert said sequence of samples to said demodulated digital signal;
      a comparator configured to determine a difference between said sequence of samples and said demodulated digital signal, said comparator further configured to provide an error energy signal representative of said difference;
      a metric determination unit configured to convert said error energy signal to a sequence of transitions to one of a pair of states, wherein first of said pair of states is indicative of random interference, wherein second of said pair of states is indicative of burst interference;
      a state determination unit configured to convert said sequence of transitions to a sequence of states, said state determination unit further configured to set an erasure flag when said sequence of states includes the second of said pair of states; and
      a delay line configured to store said demodulated digital signal, said delay line further configured to attribute said erasure flag to one of said symbols to which burst interference is associated therewith; and
   a decoder configured to receive said demodulated digital signal with associated erasure flags, said decoder further configured to correct erasures and errors in said demodulated digital signal with associated erasure flags.

7. The receiver apparatus as recited in claim 6, wherein said erasure flag is set during a time in which said received signal is subject to burst interference.

8. The receiver apparatus as recited in claim 6, wherein said decision element is configured to receive said sequence of samples, said decision element is further configured to responsively provide a nearest symbol value for each sample of said sequence of samples.

9. The receiver apparatus as recited in claim 6, wherein said decoder comprises:

a de-interleaver configured to receive said demodulated digital signal with associated erasure flags and thereafter reorder symbols and associated erasure flags therein in accordance with a standard block de-interleaver scheme to produce a de-interleaved signal with associated erasure flags; and a block decoder coupled to receive said de-interleaved signal with associated erasure flags, configured to correct erasures and errors in said de-interleaved signal with associated erasure flags, and configured to thereafter convert said de-interleaved signal to substantially said digital signal.

10. The apparatus as recited in claim 6, wherein said erasure flag is set in each of multiple locations within a region of said demodulated digital signal corresponding to intervals in which said sequence of states includes multiple instances of the second of said pair of states.

11. The apparatus as recited in claim 10, wherein said multiple locations are adjacent within said demodulated digital signal prior to entry into said de-interleaver and are separated within said de-interleaved digital signal after exit from said de-interleaver.

12. The apparatus as recited in claim 10, wherein said erasure flag may be set in multiple locations of a code word at approximately twice the quantity of erroneous symbols correctable by an apparatus absent said erasure flag.

13. A method for locating erroneous symbols within a demodulated digital signal, comprising:

finding a sequence of error values by taking the difference between said demodulated digital signal and an equalized digital signal;

converting said sequence of error values to a detected sequence of states wherein each state in said detected sequence of states is one of a pair of states, and wherein one of said pair of states is indicative of burst interference;

setting an erasure flag for regions of said demodulated digital signal which correspond to regions in which said detected sequence of states is comprised of one or more instances of said one of said pair of states;

wherein said converting step comprises:

calculating a metric for each of said pair of states at time t, wherein each of said metrics is indicative of a likelihood of a most likely sequence of states ending in a given state, each of said most likely sequences of states being extended by one state in said metric calculation; and removing a first state from each of said most likely sequences of states at time t and providing one of said first states as a subsequent state in said detected sequence of states.

14. The method of claim 13, wherein said metric calculation comprises:

adding a first constant to the metric for a first of said pair of states at time t−1 to form a first sum;

adding a second constant to the metric for a second of said pair of states at time t−1 to form a second sum;

choosing a minimum of said sums as the metric for said first of said pair of states at time t, said choosing being indicative of extending the most likely sequence of states ending in the state at time t−1 associated with the minimum of said sums, said extension comprising the first of said pair of states at time t.

15. The method of claim 14, wherein said metric calculation further comprises:

adding a third constant and a square of an error value from said sequence of error values to the metric for a first of said pair of states at time t−1 to form a third sum;

adding a fourth constant and said square of an error value from said sequence of error values to the metric for a second of said pair of states at time t−1 to form a fourth sum;

choosing a minimum of said third and fourth sums as the metric for said second of said pair of states at time t, said choosing being indicative of extending the most likely sequence of states ending in the state at time t−1 associated with the minimum of said third and fourth sums, said extension comprising the second of said pair of states at time t.

* * * * *